US008238376B2

(12) United States Patent
Iwamura

(10) Patent No.: US 8,238,376 B2
(45) Date of Patent: Aug. 7, 2012

(54) SYNCHRONIZED AUDIO/VIDEO DECODING FOR NETWORK DEVICES

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 661 days.

(21) Appl. No.: 11/386,526

(22) Filed: Mar. 20, 2006

(65) Prior Publication Data

US 2006/0233203 A1 Oct. 19, 2006

Related U.S. Application Data

(60) Provisional application No. 60/671,223, filed on Apr. 13, 2005.

(51) Int. Cl.
*H04J 3/06* (2006.01)

(52) U.S. Cl. ........................................ 370/503; 370/518

(58) Field of Classification Search .................. 370/503, 370/509, 512
See application file for complete search history.

(56) References Cited

U.S. PATENT DOCUMENTS

| | | | |
|---|---|---|---|
| 5,533,021 A | | 7/1996 | Branstad |
| 5,778,218 A | * | 7/1998 | Gulick .......................... 713/503 |
| 5,844,900 A | | 12/1998 | Hong et al. |
| 5,862,140 A | * | 1/1999 | Shen et al. ..................... 370/468 |
| 5,930,252 A | * | 7/1999 | Aaker et al. ................ 370/395.2 |
| 6,347,084 B1 | | 2/2002 | Hulyalkar |
| 6,654,956 B1 | | 11/2003 | Trinh et al. |
| 7,191,355 B1 | * | 3/2007 | Ouellette et al. .............. 713/400 |
| 7,366,206 B2 | * | 4/2008 | Lockridge et al. ............ 370/509 |
| 2003/0016732 A1 | * | 1/2003 | Miklos et al. ................. 375/132 |
| 2004/0008661 A1 | * | 1/2004 | Myles et al. .................. 370/350 |
| 2005/0166135 A1 | * | 7/2005 | Burke et al. ................ 715/500.1 |
| 2005/0168630 A1 | * | 8/2005 | Yamada et al. ............... 348/383 |
| 2005/0259754 A1 | * | 11/2005 | Ho et al. .................. 375/240.28 |

(Continued)

FOREIGN PATENT DOCUMENTS

JP 200360652 2/2003

(Continued)

OTHER PUBLICATIONS

International Search Report WO06113283 mail date Aug. 8, 2007.

(Continued)

*Primary Examiner* — Anh-Vu H Ly
*Assistant Examiner* — Maharishi Khirodhar
(74) *Attorney, Agent, or Firm* — Fitch, Even, Tabin & Flannery, LLP

(57) ABSTRACT

A method of synchronizing decoders within a network to a server includes receiving a set of timestamps and local clock signals upon receiving the beacon interrupt signal, computing differential timestamp and local clock values based on values of timestamp and local clock signals, respectively, within the sets of timestamp and local clock signals, determining whether the differential local clock value has a predetermined relationship with the differential timestamp value, and transmitting a clock rate adjustment command signal to the decoder when differential local clock value does not have the predetermined relationship with the differential timestamp value. The clock rate adjustment command signal adjusts the local system time clock of the decoder such that a subsequent differential clock value will have the predetermined relationship with the differential timestamp value. When this method is performed for each decoder within the network, the decoders are substantially synchronized and the decoding delay can be kept below humanly perceptible levels.

24 Claims, 8 Drawing Sheets

U.S. PATENT DOCUMENTS

2005/0273833 A1* 12/2005 Soinio .......................... 725/113
2006/0013407 A1* 1/2006 Peavey et al. .................. 381/56

FOREIGN PATENT DOCUMENTS

JP          2003249922          9/2003

OTHER PUBLICATIONS

International Preliminary Report on Patentability WO06113282 issue Oct. 16, 2007.
Written Opinion of the International Searching Authority WO06113283 mail date Aug. 8, 2007.
U.S. Appl. No. 10/879,445, filed Jun. 29, 2004, Iwamura.
U.S. Appl. No. 11/133,961, filed May 20, 2005, Iwamura.
Shi and Sun, Image and Video Compression for Multimedia Engineering, CRC Press 1999, pp. 449-461.
PCT International Search Report and Written Opinion of the International Searching Authority, PCT/US06/13706, mail date: Aug. 8, 2007, pp. 1-10.
First Office Action for CN 200680011393.X issued Jun. 12, 2009.
Office Action from Japanese Patent Office for Patent Application No. 2008-506647 mailed Feb. 27, 2012.

* cited by examiner

SYNCHRONIZED AUDIO/VIDEO DECODING FOR NETWORK DEVICES

This application claims the benefit of U.S. Provisional Application No. 60/671,223, filed Apr. 13, 2005, which is incorporated in its entirety herein by reference.

BACKGROUND

1. Field of Invention

Embodiments described herein relate generally to synchronized audio/video decoding for network devices.

2. Discussion of the Related Art

Various schemes have been proposed for distributing media information (e.g., video data, audio data, etc.) along communication links within a media network. One type media network is a powerline network that essentially uses the AC electrical wiring of a house (i.e., the powerline) as a transmission medium. Accordingly, within a powerline network, a network server can transmit media information (i.e., one or more encoded data streams) to one or more network clients that are "plugged in" to AC electrical outlets within a house. The network clients receive and decode the encoded data stream and output the decoded data stream in an audio and/or video format.

One drawback to conventional powerline networks is that network clients have no synchronization mechanism. Thus, even when two network clients begin decoding an encoded data stream at the same time, a delay between them gets gradually larger over time because oscillators of the locks within the decoders operate independently. If the audio delay becomes larger than 30 msec, an undesirable echo effect (i.e., the Haas Effect) occurs, resulting in the user hearing two audio tones. Such an echo effect undesirably detracts from the user's enjoyment of music being played in surround-sound audio decoding systems. The accuracy of a typical oscillator within a decoder clock is more than 10 parts per million (ppm). One hour is 3600 seconds. Therefore, 10 ppm is equivalent to 36 msec. Accordingly, conventional powerline networks will exhibit the undesirable Hass Effect within one hour of decoding audio data.

Accordingly, it would be beneficial to provide a method and system adapted to synchronize operations of decoders within a network.

SUMMARY

Several embodiments disclosed herein advantageously address the needs above as well as other needs by providing a method and system enabling synchronized audio/video decoding for network devices.

One embodiment exemplarily described herein provides a method of synchronizing a decoder within a network to a server that includes receiving a set of timestamp signals upon receipt of beacons transmitted by the network server, receiving a set of local clock signals upon receipt of beacons transmitted by the network server, computing a differential timestamp value based on values of timestamp signals within the set of timestamp signals, computing a differential local clock value based on values of local clock signals within the set of local clock signals, determining whether the differential local clock value has a predetermined relationship with respect to the differential timestamp value, and transmitting a clock rate adjustment command signal to the decoder when it is determined that the differential local clock value does not have the predetermined relationship with the differential timestamp value, the clock rate adjustment command signal adapted to adjust the local system time clock such that a subsequent differential local clock value will have the predetermined relationship with the differential timestamp value. Each timestamp signal within the set of timestamp signals has a value corresponding to a timestamped beacon transmitted by a network server. Each local clock signal within the set of local clock signals has a value generated by a local system time clock associated with a decoder of a network client. The network server is adapted to stream encoded data over a network and the decoder is adapted to decode the encoded data.

Another embodiment exemplarily described herein provides a network device that includes a network interface adapted to receive encoded data transmitted over a network, a decoder coupled to the network interface adapted to decode the received encoded data, and a processor coupled to the network interface and decoder. The processor contains circuitry adapted to receive a set of timestamp signals via the network interface upon receipt of beacons transmitted by the network server, receive a set of local clock signals upon receipt of beacons transmitted by the network server, compute a differential timestamp value based on values of timestamp signals within the set of timestamp signals, compute a differential local clock value based on values of local clock signals within the set of local clock signals, determine whether the differential local clock value has a predetermined relationship with respect to the differential timestamp value, and transmit a clock rate adjustment command signal to the decoder when it is determined that the differential local clock value does not have the predetermined relationship with the differential timestamp value. Each timestamp signal within the set of timestamp signals has values corresponding to a timestamped beacon transmitted by a network server. Each local clock signal within the set of local clock signals has a value generated by a local system time clock associated with the decoder. The clock rate adjustment command signal is adapted to adjust the local system time clock such that a subsequent differential local clock value will have the predetermined relationship with the differential timestamp value.

BRIEF DESCRIPTION OF THE DRAWINGS

The above and other aspects, features and advantages of several embodiments described herein will be more apparent from the following more particular description thereof, presented in conjunction with the following drawings.

Figure 1:
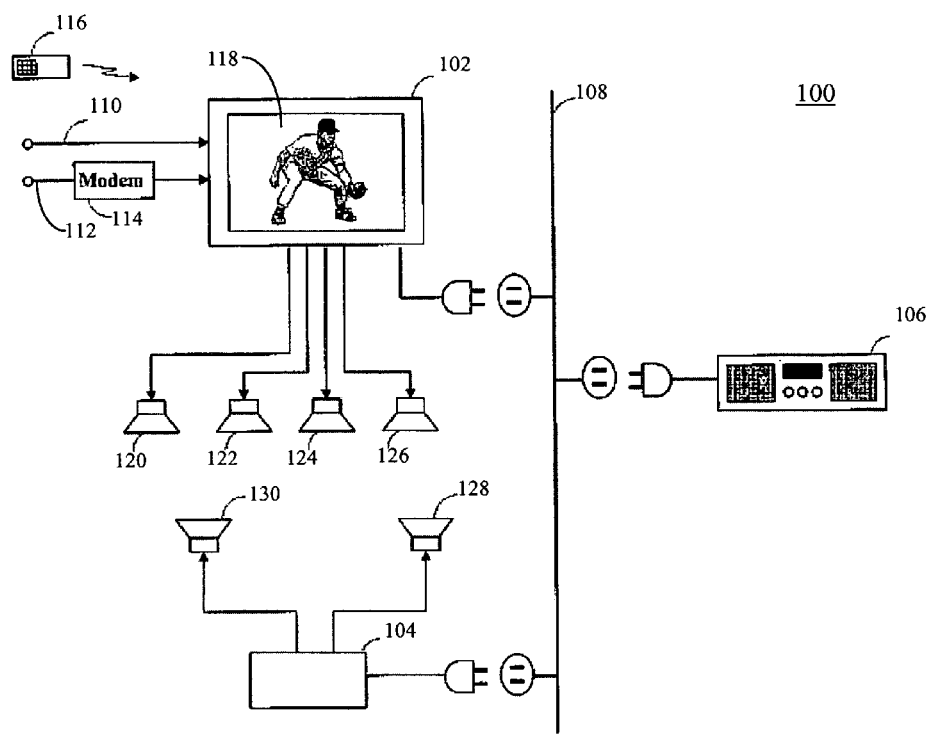
FIG. 1 illustrates an exemplary network within which numerous embodiments disclosed herein can be implemented.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments described herein. Also, common but well-understood elements that are useful or necessary in a commercially feasible embodiment are often not depicted in order to facilitate a less obstructed view of these various embodiments described herein.

DETAILED DESCRIPTION

The following description is not to be taken in a limiting sense, but is made merely for the purpose of describing the general principles of exemplary embodiments. The scope of the invention should be determined with reference to the claims.

As disclosed herein, numerous embodiments allow decoders within a network to decode data in synchrony with other decoders within the network. Accordingly, numerous embodiments enable substantially synchronous operation by adjusting system time clocks (STCs) of decoders (i.e., local STCs) based upon timestamps output by a network server. Other embodiments enable substantially synchronous operation by adjusting the buffer occupancy of the decoders. By adjusting the STC and/or the buffer occupancy of decoders within the network, the decoders can decode encoded data substantially synchronously. When methods disclosed herein are performed for each decoder within the network, the decoders are substantially synchronized and a decoding delay between decoders can be kept below a humanly perceptible level. For instance, in a server television, the STC in an audio decoder and the STC in a video decoder are internally synchronized. These two decoders and the processor receive beacon interrupts and adjust the STC of each decoder. Preferably, no large delay, e.g., of more than 1 millisecond, occurs between any decoders.

FIG. 1 illustrates an exemplary network 100 within which numerous embodiments disclosed herein can be implemented. Shown in FIG. 1 are a television 102, an audio amplifier unit 104, a stereo 106, an AC powerline 108, a cable input line 110, a network input line 112 (e.g., cable coax line or an ADLS telephone line), a modem 114 (e.g., a cable modem, an ADSL telephone line modem, or the like), a remote control 116, a display 118, and speakers 120, 122, 124, 126, 128, and 130.

The television 102, audio amplifier unit 104, and stereo 106 are each connected to the AC powerline 108. The television 102 is connected to the cable input line 110 and is also connected to the network input line 112 via modem 114. Speakers 120, 122, 124, and 126 connected to the television 102 and speakers 128 and 130 connected to the audio amplifier unit 104. In the embodiment exemplarily illustrated in FIG. 1, speakers 120, 122, 124, 126, 128 and 130 constitute a surround-sound system, wherein speaker 120 is a front bass speaker, speakers 122, 124, and 126 are front speakers (e.g., left, center, and right speakers, respectively), and speakers 128 and 130 are rear speakers (e.g., left and right speakers, respectively).

Generally, and in accordance with numerous embodiments, the television 102 is adapted to receive audio and/or video signals from the cable input line 110 and/or from the network input line 112 via modem 114. The television 102 is further adapted to process the received video signals to generate an image on the display 118, to process the received audio signals to generate sound at speakers 120, 122, 124, and 126, and to transmit (i.e., stream) portions of the received signals over the powerline 108.

Generally, and in accordance with numerous embodiments, the audio amplifier unit 104 is adapted to receive encoded audio signals transmitted over the powerline 108, decode the received audio signals, and output decoded audio signals to the speakers 128 and 130. Similarly, the stereo 106 is adapted to receive an encoded audio signal from the television 102 via the powerline 108, decode the received audio signal, and output the decoded audio signal to a speaker incorporated therein. The stereo 106 may also be adapted to send playback commands (e.g., play, stop, pause, etc.) to the television 102 via the powerline 108.

As discussed herein, the network 100 is a powerline network (i.e., a network that uses the household electrical powerline as a medium for transmission of audio and video data). Accordingly, the television 102 may act as a network server of the network 100 and the audio amplifier unit 104 and stereo 106 may act as network clients of the network 100. General duties of the network server include broadcasting beacons over the powerline 108, transmitting (i.e., streaming) encoded audio/video data to network clients, transmitting commands (e.g., to begin decoding encoded data, to stop decoding encoded data, etc.) to network clients, and otherwise coordinating operations of the network clients. In one embodiment, operations of the network clients and the network server are coordinated based upon the broadcasting of beacons. While embodiments are herein discussed with respect to powerline networks, it will be appreciated that the network 100 can comprise any other wired or wireless network that operates using beacons.

Figure 2:
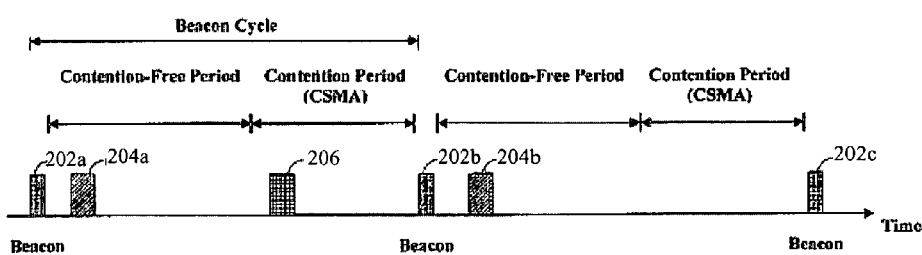
FIG. 2 illustrates an exemplary network access timing chart.

FIG. 2 illustrates an exemplary network access timing chart. As shown in FIG. 2, acting as the network server, the television 102 broadcasts beacons 202a, 202b, 202c, etc. In one embodiment, the television 102 periodically broadcasts the beacons (e.g., every 40 msec). Accordingly, each beacon cycle is about 40 msec in duration. It will be appreciated, however, that beacon transmission does not need to be periodic as long as there is sufficient time to perform a clock adjustment process as described below. In one embodiment, the each beacon is broadcast in synchrony with the AC line cycle of the powerline 108 (e.g., 50 Hz or 60 Hz). In one embodiment, a timestamp is transmitted with (i.e., is included within) each beacon. A beacon is timestamped based on a system clock of the television 102. In another embodiment, a timestamp is transmitted separate from each beacon.

Each beacon cycle is divided into a contention-free period and a contention period. Isochronous transmissions are performed during the contention-free period in which a time-slot 204a, 204b, etc., is reserved in every beacon cycle during which no other transmission is permitted. Encoded audio/video data streamed by the television 102 utilizes isochronous transmissions. Asynchronous transmissions (e.g., at 206) are performed during the contention period in which carrier sense multiple access (CSMA) is allowed. Commands and files, typically transferred between the server and clients of the network 100, utilize asynchronous transmissions.

Figure 3:
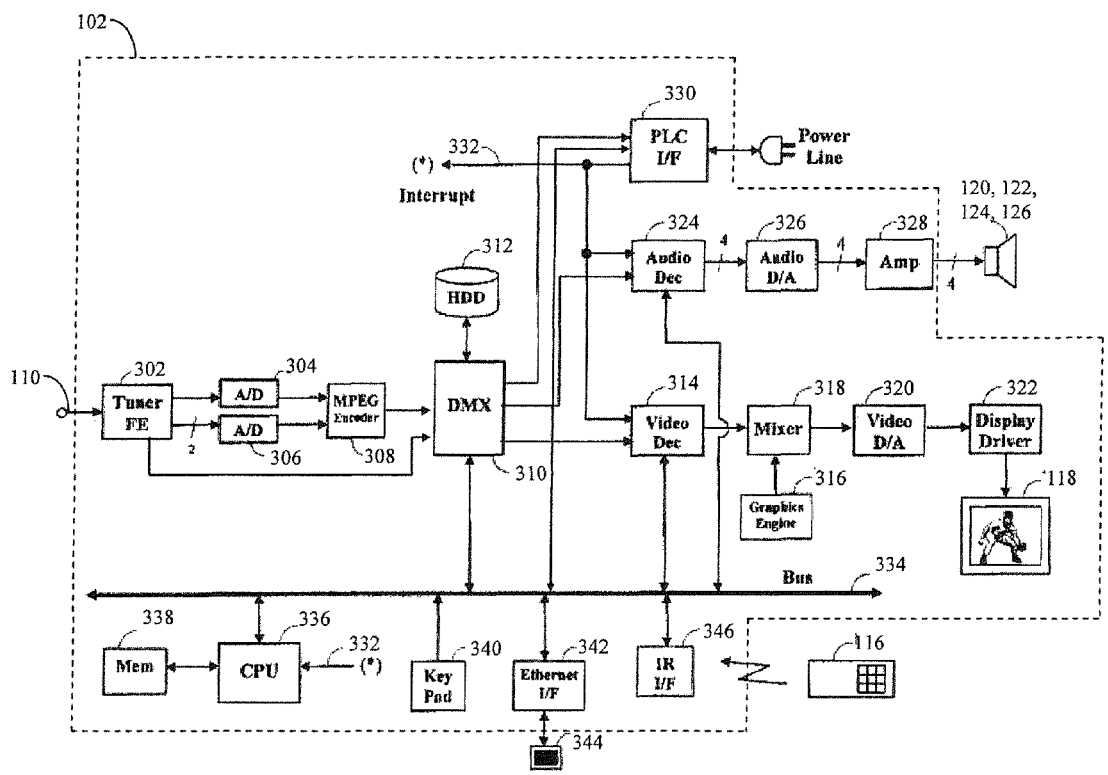
FIG. 3 illustrates a block diagram of the television shown in FIG.

FIG. 3 illustrates a block diagram of the television 102 shown in FIG. 1. Shown in FIG. 3, are the aforementioned cable input line 110, remote control 116, and speakers 120, 122, 124, and 126, in addition to a tuner 302, a video analog-to-digital (AD) converter 304, an audio AD converter 306, an MPEG encoder 308, a demultiplexer 310, a clock generator 350, a hard disk drive (HDD) 312, a video decoder 314, a graphics engine 316, a mixer 318, the display 118, a video digital-to-analog (DA) converter 320, a display driver 322, an audio decoder 324, a 4-channel audio DA converter 326, a 4-channel amplifier 328, a powerline communication (PLC) interface 330, an interrupt line 332, an internal bus 334, a processor 336 (e.g., one or more CPUs), a memory 338, a key pad 340, an Ethernet interface 342, an Ethernet port 344, and an infra-red (IR) interface 346. Although not shown, the video decoder 314 and audio decoder 324 both include a local buffer and an STC. In one embodiment, the video decoder 314 and the audio decoder 324 and/or the demultiplexer 310 can be integrated within a single chip.

The tuner 302 is connected to the cable input line 110, the video AD converter 304 and audio AD converter 306 are each connected to the tuner 302, the MPEG encoder 308 is connected to the video AD converter 304 and to the audio AD converter 306 and the demultiplexer 310 is connected to the MPEG encoder 308. The HDD 312, the video decoder 314, the audio decoder 324, and the PLC interface 330 are connected to the demultiplexer 310. The mixer 318 is connected to the video decoder 314 and the graphics engine 316, the video DA converter 320 is connected to the mixer 318, the display driver 322 is connected to the video DA converter 320, and the display 118 is connected to the display driver 322. The 4-channel audio DA converter 326 is connected to the audio decoder 324, the 4-channel amplifier 328 is connected to the 4-channel audio DA converter 326, and speakers 120, 122, 124, and 126 are connected to the 4-channel amplifier 328. The PLC interface 330 is connected to the powerline 108. The interrupt line 332 connects the PLC interface 330, the video decoder 314 and the audio decoder 324 with the processor 336. Each of the aforementioned components may be connected to the internal bus 334. For purposes of clarity in illustration, however, only the demultiplexer 310, the video and audio decoders 314 and 324, respectively, the PLC interface 330, the processor 336, the memory 338, the key pad 340, the Ethernet interface 342, and the IR interface 346 are shown to be connected to the internal bus 334. The tuner 302 tunes and demodulates an analog cable signal from the cable input line 110. The analog video output of the tuner 302 is received at the video AD converter 304 where it is converted into a digital video signal. Similarly, the analog audio output of the tuner 302 is received at the audio AD converter 306 where it is converted into a digital audio signal. The audio and video digital outputs are then received at the MPEG encoder 308 where they are encoded using an MPEG format and output to the demultiplexer 310 as an encoded data stream.

The clock generator 350 generates the aforementioned system clock. The system clock rate is, for example, 27 MHz. The system clock is synchronized to a digital or NSTC timing signal generated at the video and audio AD converters 304 and 306, respectively. The system clock is distributed to the MPEG encoder 308, the demultiplexer 310, and the PLC interface 330.

The MPEG encoder 308 further embeds a reference clock (e.g., a system clock reference (SCR) or program clock reference (PCR)) at intervals of 100 to 700 msec within the encoded data output to the demultiplexer 310. The system clock is synchronized to the SCRs or PCRs. Conventionally, the SCR/PCR is used in order to synchronize the decoder STC. In the system disclosed herein, however, SCR/PCR is not used because it is difficult to synchronize two or more decoders using SCR/PCR. Whether or not SCR/PCR is used, the SCR/PCR is embedded in a MPEG stream output by the MPEG encoder 308. A decoding timestamp (DTS) is included for each access data unit, for example, each video frame. A DTS is generated based on the system clock.

The PLC interface 330 broadcasts a beacon. The beacon is timestamped based on the system clock of the clock generator 350. Accordingly, timestamps are generated by a timestamp clock that is synchronized to the digital or NSTC signal and that has timestamp clock rate (i.e., a network clock rate) of 25 MHz.

The demultiplexer 310 receives the encoded data stream from the MPEG encoder 308, demultiplexes the encoded data stream into encoded video and audio data streams, transmits the encoded video stream to the video decoder 314, and transmits at least a portion of the encoded audio stream to the audio decoder 324. For the audio amplifier unit 104, the demultiplexer 310 also transmits at least a portion of the encoded data stream (e.g., at least a portion of the encoded audio stream) to the PLC interface 330.

In case of digital cable broadcast, the tuner 302 outputs a digital stream, for example, a MPEG stream directly to the demultiplexer 310. SCRs/PCRs and DTSs are embedded at the head end in the broadcast station. The system clock is synchronized to the SCRs or PCRS. The digital stream from the tuner 302 may, for example, include several TV programs. The demultiplexer 310 filters out unnecessary data based on the command from the processor 336. Only the selected audio/video data is sent to each of the video decoder 314 and the audio decoder 324.

The video decoder 314 decodes the encoded video data stream output by the demultiplexer 310 at a rate corresponding to the frequency of its own STC and outputs the decoded video data stream to the mixer 318. The local buffer within the video decoder 314 stores encoded data received from the demultiplexer 310 until the encoded data is ready to be decoded. The encoded data is decoded when the STC of the video decoder 314 reaches the time specified the DTS. Moreover, the rate at which the video decoder 314 retrieves encoded data stored within the local buffer is dependent upon the frequency of the local STC. The mixer 318 mixes the decoded video data stream output by the video decoder 314 with graphics data generated within, and output by, the graphics engine 316 to generate video graphic data. Video graphic data is, for example, an electronic program guide table, which allows the user to select a TV program to watch or to record. The video graphic data is then converted into an analog video signal by the video DA converter 320. The display driver 322 receives the analog video signal output by the video DA converter 320 and drives the display 118 to display a corresponding image.

The audio decoder 324 decodes the encoded audio data stream output by the demultiplexer 310 at a rate corresponding to the frequency of its own STC and outputs the decoded audio data stream to the 4-channel audio DA converter 326 where the decoded audio stream is converted into analog audio signals. The local buffer within the audio decoder 324 stores encoded data received from the demultiplexer 310 until the encoded data is ready to be decoded. The encoded data is decoded when the STC of the audio decoder 324 reaches the time specified the DTS. Moreover, the rate at which the audio decoder 324 retrieves encoded data stored within the local buffer is dependent upon the frequency of the local STC. The 4-channel amplifier 328 receives the analog audio signals output by the 4-channel audio DA converter 326, amplifies the audio signals, and outputs the amplified audio signals to the speakers 120, 122, 124, 126.

The PLC interface 330 receives at least a portion of the encoded data stream from the demultiplexer 310 and is adapted to transmit (i.e., stream) the received encoded data, in addition to beacons and any other commands via the powerline 108. In one embodiment, the PLC interface 330 also transmits the timestamps via the powerline 108.

The processor 336 contains circuitry adapted to control the each of aforementioned components via internal bus 334 in accordance with one or more control programs stored within the memory 338. In one embodiment, the processor 336 is further adapted to control the operations of the network clients within the network 100. In another embodiment, the processor 336 is further adapted to cause the PLC interface 330 to transmit beacons and timestamps over the powerline 108. By transmitting timestamps over the powerline 108, the entire network 100 shares a common network clock. As used herein, the term "circuitry" refers to any type of executable instructions that can be implemented as, for example, hardware, firmware, and/or software, which are all within the scope of the various teachings described.

The key pad 340 is adapted to be engaged by a user and transmit data and/or commands directly to the processor 336 when engaged by the user. The aforementioned modem 114 is connected to the Ethernet port 344 and the processor 336 communicates with (e.g., receives/transmits data) the modem 114 via the Ethernet interface 342. The IR interface 346 is adapted to receive IR signals transmitted, for example, a user engaging the remote control 116 and transmit data and/or commands such as channel up/down, volume up/down, etc.

For recording, the demultiplexer 310 sends a part or whole of the incoming stream to the HDD 312. For replay, the demultiplexer 310 receives and demultiplexes the stream from the HDD 312. The video data is sent to the video decoder 314 and the audio data is sent to the audio decoder 324 as mentioned above.

Figure 4:
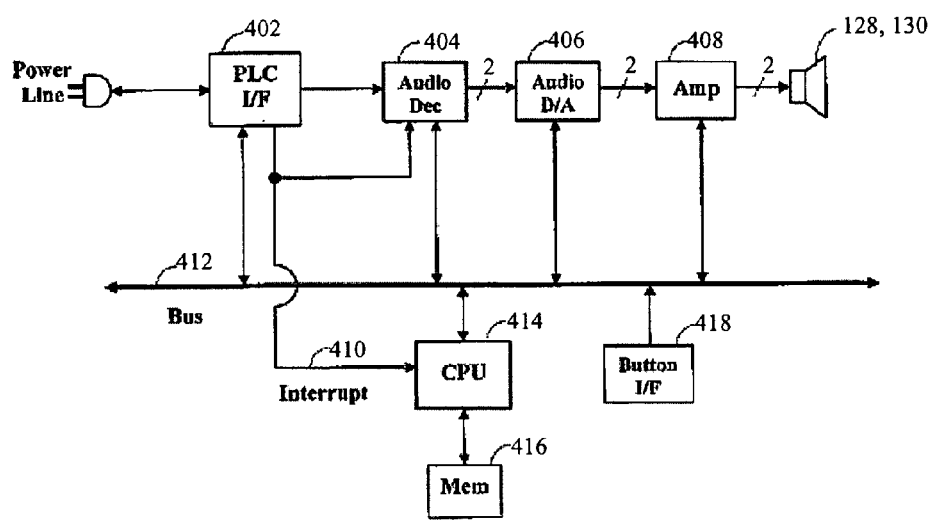
FIG. 4 illustrates a block diagram of the audio amplifier unit shown in FIG. 1.

FIG. 4 illustrates a block diagram of the audio amplifier unit 104 shown in FIG. 1. The stereo 106 may be similarly configured as described with respect to the audio amplifier unit 104. Shown in FIG. 4 are a PLC interface 402, an audio decoder 404, a 2-channel audio DA converter 406, a 2-channel amplifier 408, the aforementioned speakers 128 and 130, an interrupt line 410, an internal bus 412, a processor 414 (e.g., one or more CPUs), a memory 416, and a user interface (e.g., button interface) 418. Although not shown, the audio decoder 404 includes a local buffer and a system time clock (STC). In one embodiment, the audio decoder 404 and the 2-channel audio DA converter 406 can be integrated within a single chip.

The PLC interface 402 is connected to the powerline 108, the audio decoder 404 is connected to the PLC interface 402, the 2-channel audio DA converter 406 is connected to the audio decoder 404, the 2-channel amplifier 408 is connected to the 2-channel audio DA converter 406, and the aforementioned speakers 128 and 130 are connected to the 2-channel amplifier 408. The interrupt line 410 is connected between the PLC interface 402, the audio decoder 404 and the processor 414. The memory 416 is connected to the processor 414. The local buffer within the audio decoder 404 stores encoded data received from the PLC interface 402 until the encoded data is ready to be decoded. The encoded data is decoded when the STC of the audio decoder 404 reaches the time specified the DTS. Moreover, the rate at which the audio decoder 404 retrieves encoded data stored within the local buffer is dependent upon the frequency of the local STC. Further, the PLC interface 402, audio decoder 404, 2-channel audio DA converter 406, 2-channel amplifier 408, processor 414, and user interface 418 are connected to the internal bus 412.

The PLC interface 402 receives all beacons, timestamps, commands, data (e.g., encoded audio data), etc. transmitted over the powerline 108. Encoded data received at the PLC interface 402 is output to the audio decoder 404 where it is decoded at a rate corresponding to the frequency of its own STC. The audio decoder 404 outputs the decoded audio data to the 2-channel audio DA converter 406 where the decoded audio data is converted into analog audio signals. The 2-channel amplifier 408 receives the analog audio signals output by the 2-channel audio DA converter 406, amplifies the audio signals, and outputs the amplified audio signals to the speakers 128 and 130.

The processor 414 contains circuitry adapted to control the each of aforementioned components via internal bus 412 in accordance with one or more control programs stored within the memory 416. The user interface 418 is adapted to be engaged by a user and transmit data and/or commands (e.g., channel, volume up/down, etc.) directly to the processor 414 when engaged by the user. The processor 414 exchanges asynchronous data (e.g., commands, data, etc.), for example, a command from the remote control 116 with processor 336 via the PLC interface 402.

Figure 5:
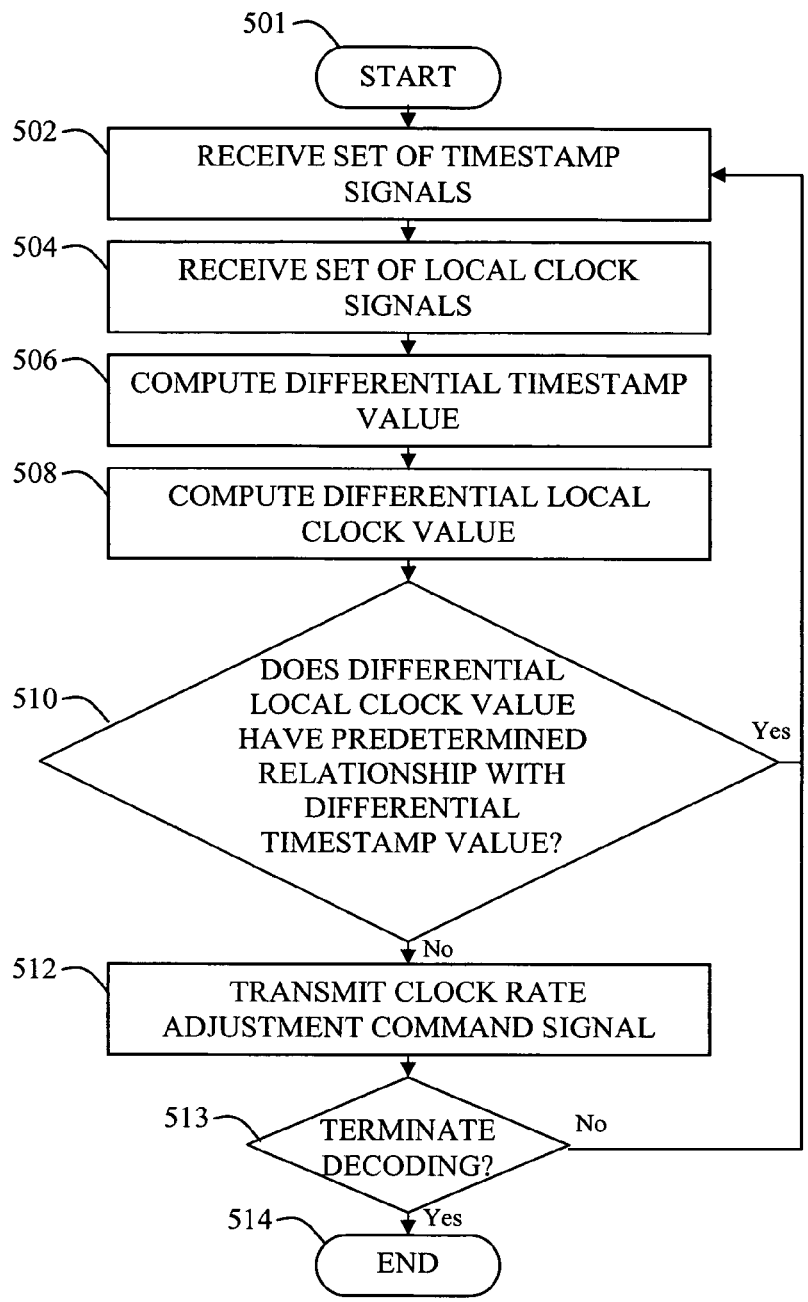
FIG. 5 describes one embodiment of an exemplary clock adjustment process.

Because the network 100 includes multiple decoders (e.g., two in the television 102 and one in the audio amplifier unit 104), the frequency of each STC within each decoder can be adjusted according to a clock adjustment process adapted to ensure that the decoders are operating in substantial synchrony with each other. FIG. 5 describes one embodiment of an exemplary clock adjustment process.

As shown in FIG. 5, the process starts at 501. At 502, a set of timestamp signals is received at, for example, the processor 414 of the audio amplifier unit 104. A timestamp signal identifies a value of the timestamp contained within a beacon that has been broadcast by the television 102. Accordingly, the set of timestamp signals identifies a plurality of timestamp values contained within, or transmitted separately from, a predetermined number of beacons that have been output during a period by the PLC interface 330 of the television 102.

At 504, a set of local clock signals is sent from the audio decoder 404 and received at, for example, the processor 414. A local clock signal identifies an STC value stored within, for example, the audio decoder 404 at a time corresponding to when the PLC interface 402 received a beacon output by the PLC interface 330. Accordingly, the set of local clock signals identifies a plurality of STC values stored by the STC of the audio decoder 404.

At 506, a differential timestamp value is computed at, for example, the processor 414 of the audio amplifier unit 104. In one embodiment, the differential timestamp value corresponds to the difference in values between a pair of timestamps that have been consecutively transmitted by the PLC interface 330. For example, the differential timestamp value (diff_ts) may correspond to a difference in values between an $n^{th}$ timestamp (timestamp(n)) transmitted by the PLC interface 330 and an $n+1^{th}$ timestamp (timestamp(n+1)) transmitted by the PLC interface 330. In one embodiment, differential timestamp value (diff_ts) can be computed according to the following formula: diff_ts=(timestamp(n+1)−(timestamp(n))*fstc/fts, wherein "fstc" is the clock frequency of the STC within the audio decoder 404 (e.g., 27 MHz) and "fts" is the aforementioned timestamp clock rate of 25 MHz. In another embodiment, the differential timestamp value is an average difference in values between a plurality of pairs of consecutively output timestamps. For example, the differential timestamp value may correspond to an average difference in values between the $n^{th}$ and $n+1^{th}$ timestamps, between the $n+2^{th}$ and $n+3^{th}$ timestamps, between the $n+4^{th}$ and $n+5^{th}$ timestamps, etc.

At 508, a differential local clock value is computed at, for example, the processor 414. In one embodiment, the differential local clock value corresponds to the difference in values between a pair of STC values stored within the audio decoder 404 that correspond to beacons that have been consecutively output by the television 102. For example, the differential local clock value (diff_stc) may correspond to a difference in values between an $n^{th}$ STC value (STC(n)) stored within the audio decoder 404 and an $n+1^{th}$ STC value (STC(n+1)) stored within the audio decoder 404. In one embodiment, the differential local clock value (diff_stc) can be computed according to the following formula: diff_stc=STC(n+1)−STC(n). In another embodiment, the differential local clock value is an average difference in values between a plurality of pairs of consecutively stored STC values. For example, the differential local clock value may correspond to an average difference in values between the $n^{th}$ and $n+1^{th}$ STC values, between the $n+2^{th}$ and $n+3^{th}$ STC values, between the $n+4^{th}$ and $n+5^{th}$ STC values, etc.

At 510, the differential timestamp value and the differential local clock value are compared at, for example, the processor 414 to determine whether the differential local clock value has a predetermined relationship with the differential timestamp value. In one embodiment, the differential local clock value has the predetermined relationship with the differential timestamp value when the differential local clock value and the differential timestamp value are either equal or substantially equal (i.e., not perfectly equal but within a certain allowable range of each other). By defining the predetermined relationship as existing when the differential local clock value and the differential timestamp value are substantially equal, the processor 414 can be prevented from too frequently sending an adjustment command to the audio decoder 404 when the difference between the differential local clock value and the differential timestamp value is small.

When the comparing at 510 indicates that the predetermined relationship exists between the differential local clock value and the differential timestamp value (i.e., if the differential local clock value and the differential timestamp value are perfectly equal or if the differential local clock value and the differential timestamp value are within the certain margin of allowance), no adjustment is executed and the process goes back to 502. However, when the comparing at 510 indicates that the differential local clock value is larger than the differential timestamp value (or larger than the differential timestamp value plus the certain margin of allowance), the frequency of the STC in the audio decoder 404 is presumed to be running faster than the frequency of the common network clock. Conversely, when the comparing at 510 indicates that the differential local clock value is smaller than the differential timestamp value (or smaller than the differential timestamp value minus the certain margin of allowance), the frequency of the STC in the audio decoder 404 is presumed to be running slower than the frequency of the common network clock.

At 512, a clock rate adjustment command signal is transmitted from, for example, the processor 414 to the STC of the audio decoder 404 when it is determined that the differential local clock value does not have the predetermined relationship with the differential timestamp value. In one embodiment, the processor 414 transmits the clock rate adjustment command signal before the next (i.e., subsequent) beacon is transmitted by the television 102.

The clock rate adjustment command signal is adapted to adjust the frequency of the STC of the audio decoder 404 (e.g., increase or decrease the frequency of the STC) based on the results of the comparing at 510 so as to bring the differential local clock value closer to, or within, the predetermined relationship of the differential timestamp value. In one embodiment, the clock rate adjustment command signal is adapted to adjust the frequency of the STC of the audio decoder 404 by a fixed adjustment amount. In another embodiment, the clock rate adjustment command signal is adapted to adjust the frequency of the STC of the audio decoder 404 by one of a plurality of fixed adjustment amounts, depending upon the degree to which the differential local clock value differs from the differential timestamp value. For example, if the difference between the differential local clock value and the differential timestamp value is within a predetermined threshold outside the predetermined relationship, the clock rate adjustment command signal is adapted to adjust the frequency of the STC of the audio decoder 404 by a first fixed adjustment amount. For example, the predetermined threshold may be 100 ppm of the differential timestamp value. If the difference is within that value, the command may cause the STC frequency to increase or decrease by 10 ppm.) If, however, the difference between the differential local clock value and the differential timestamp value is outside the predetermined threshold, the clock rate adjustment command signal is adapted to adjust the frequency of the STC of the audio decoder 404 by a second fixed adjustment amount, wherein an absolute value of the second fixed adjustment amount is larger than an absolute value of the first fixed adjustment amount. For example, if the difference is not within the predetermined threshold of 100 ppm, the command may cause the STC frequency to increase or decrease by 20 ppm.

At 513, it is determined whether decoding is terminated or not. If decoding is not terminated, the process goes back to 502. If decoding is terminated, the process ends at 514.

Figure 6:
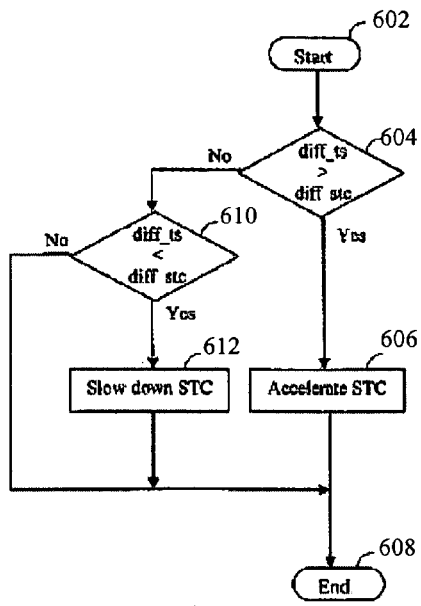
FIG. 6 illustrates an exemplary implementation of comparing the differential local clock value and the differential timestamp value and transmitting clock adjustment signals as described above with respect to FIG. 5.

FIG. 6 illustrates an exemplary implementation of comparing the differential local clock value and the differential timestamp value and transmitting clock adjustment signals as described above with respect to FIG. 5. It will be appreciated that the algorithm exemplarily shown in FIG. 6 can be executed every time a beacon arrives at the decoder. As shown in FIG. 6, and proceeding from 602 (e.g., where the differential local clock value and the differential timestamp value have been computed), the processor 414 determines whether the differential timestamp value is greater than the differential local clock value at 604. If, at 604, the processor 414 determines that the differential timestamp value is greater than the differential local clock value, then, at 606, the processor 414 transmits a clock rate adjustment command signal adapted to increase the frequency of the STC in the audio decoder 404 so as to bring the differential local clock value closer to, or within, the predetermined relationship of the differential timestamp value. The process ends at 608.

If, at 604, the processor 414 determines that the differential timestamp value is not greater than the differential local clock value, then the processor 414 determines whether the differential timestamp value is less than the differential local clock value at 610. If, at 610, the processor 414 determines that the differential timestamp value is less than the differential local clock value, then, at 612, the processor 414 transmits a clock rate adjustment command signal adapted to decrease the frequency of the STC in the audio decoder 404 so as to bring the differential local clock value closer to, or within, the predetermined relationship of the differential timestamp value.

If, at 610, the processor 414 determines that the differential timestamp value is not less than the differential local clock value, then the processor 414 presumes that the predetermined relationship exists between the differential local clock value and the differential timestamp value. In this case, no clock adjustment will be done. The process ends at 608.

Figure 7:
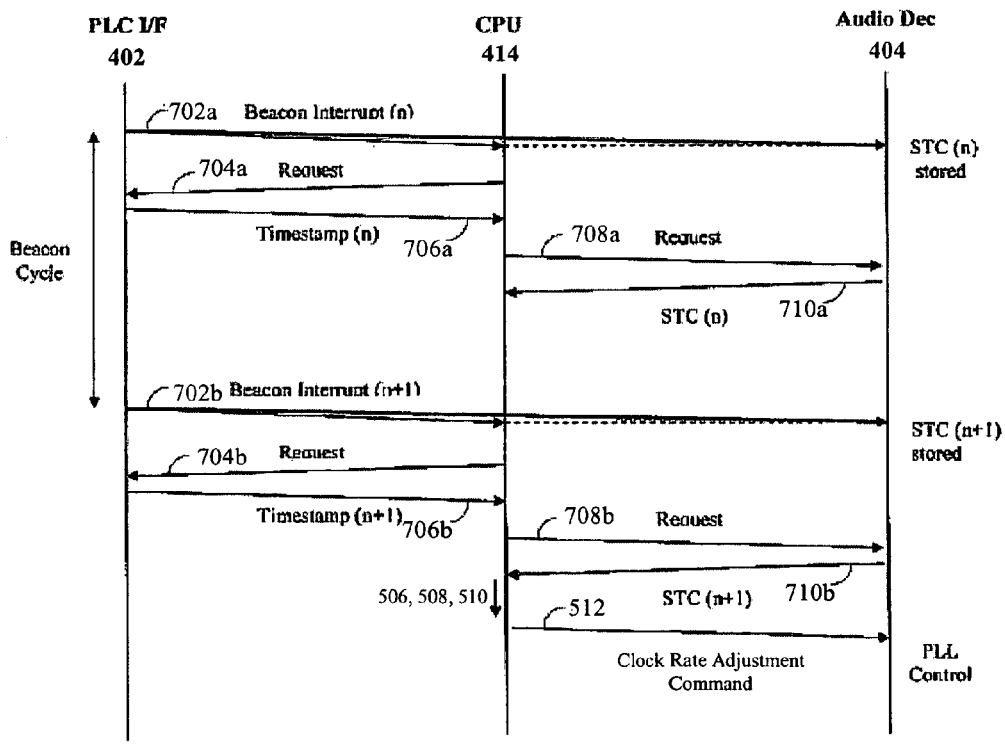
FIG. 7 illustrates an exemplary transmission sequence of signals between components of the network client, in accordance with the exemplary clock adjustment process described with respect to FIG. 5.

FIG. 7 illustrates an exemplary transmission sequence of signals between the PLC interface 402, the processor 414, and the audio decoder 404 of the audio amplifier unit 104, in accordance with the clock adjustment process described above with respect to FIG. 5. As shown in FIG. 7, and at 702a, the PLC interface 402 receives an $n^{th}$ beacon that has been broadcast by the television 102, generates a corresponding beacon interrupt signal (i.e., beacon interrupt (n)) and transmits the generated beacon interrupt signal to the audio decoder 404 and the processor 414 via the interrupt line 410. Alternatively, the PLC interface 402 may transmit the generated beacon interrupt signal only to the processor 414 (e.g., via the internal bus 412) and the processor 414 may, in turn, forward the beacon interrupt signal to the audio decoder 404 via the internal bus 412. Upon receiving the beacon interrupt signal (Beacon Interrupt (n)), the audio decoder 404 stores an STC value (STC(n)). At 704a, the processor 414 responds to the received beacon interrupt signal (beacon interrupt (n)) by transmitting a timestamp request signal to the PLC interface 402. At 706a, the PLC interface 402 responds to the timestamp request signal by transmitting a timestamp signal (timestamp(n)) to the processor 414. In one embodiment, however, the PLC interface 402 may transmit a timestamp signal to the processor 414 without responding to any timestamp request signal. The timestamp was carried by the $n^{th}$ beacon. At 708a, the processor 414 further responds to the received beacon interrupt signal (beacon interrupt (n)) by transmitting a local clock request signal to the audio decoder 404. At 710a, the audio decoder 404 responds to the local clock request signal by transmitting the stored local clock value STC(n) to the processor 414. In one embodiment, however, the audio decoder 404 may transmit the stored local clock value STC(n) to the processor 414 without responding to any the local clock request signal. In one embodiment, the request signals transmitted at 704a and 708a may be a single request command which is broadcast to both the PLC interface 402 and the audio decoder 404.

As discussed above with respect to FIG. 5, the differential timestamp value and differential local clock value are computed based on sets of timestamp and local clock signals. Accordingly, when the PLC interface 402 receives another beacon broadcast after the $n^{th}$ beacon (e.g., an $n+1^{th}$ beacon), the PLC interface 402, at 702b, generates and transmits a corresponding beacon interrupt signal (beacon interrupt (n+1)) to the audio decoder 404 and/or the processor 414. Upon receiving the beacon interrupt signal (beacon interrupt (n+1)), the audio decoder 404 stores an STC value (STC(n+1)). At 704b, the processor 414 responds to the received beacon interrupt signal (beacon interrupt (n+1)) by transmitting a timestamp request signal to the PLC interface 402. At 706b, the PLC interface 402 responds to the timestamp request signal by transmitting a timestamp signal (timestamp (n+1)) to the processor 414. In one embodiment, however, the PLC interface 402 may transmit a timestamp signal to the processor 414 without responding to any timestamp request signal. The time stamp was carried by the (n+1)th beacon. At 708b, the processor 414 further responds to the received beacon interrupt signal (Beacon Interrupt (n+1)) by transmitting a local clock request signal to the audio decoder 404. At 710b, the audio decoder 404 responds to the local clock request signal by transmitting the stored local clock value STC(n+1) to the processor 414. In one embodiment, however, the audio decoder 404 may transmit the stored local clock value STC(n) to the processor 414 without responding to any the local clock request signal. The processes generally described above at 702, 704, 706, 708, and 710 may be repeated as desired upon receiving subsequently broadcast beacons (e.g., an $n+2^{th}$ beacon, an $n+3^{th}$ beacon, etc.) until sets of timestamp and local clock signals, each containing a desired number of timestamp signals and local clock signals, have been received at the processor 414. After sets of timestamp and local clock signals have been received by the processor 414, the differential timestamp value and the differential local clock value are computed as described above with respect to 506 and 508. The differential timestamp value and the differential local clock value are compared at 510. If clock adjustment is required, at 512, the processor 414 sends a clock adjustment command to the audio decoder 404.

Although the clock adjustment process has been specifically described above with respect to adjustment of the STC in the audio decoder 404, it will be appreciated that the aforementioned processes described above with respect to FIGS. 5-7 may be applied to adjust any STC within the decoder of any network client. Further, the aforementioned processes described above with respect to FIGS. 5-7 may be applied to adjust one or more STCs in decoders of the network server (e.g., the video decoder 314 and/or audio decoder 324). In this case, the PLC interface 330 generates and transmits a beacon interrupt signal to the video and audio decoders 314 and 324, respectively, as well as to the processor 336 via the interrupt line 332 whenever a beacon is transmitted over the powerline 108 therefrom.

The process described above with respect to FIGS. 5-7 is repeated for a predetermined amount of time (e.g., about 300 msec) as measured by the processor 336, after which the processor 336 assumes that the predetermined relationship exists between the differential local clock values of the decoders within the network and the differential timestamp value. Accordingly, when STCs of all decoders within the network 100 are adjusted as described above, the STCs of all decoders within the network 100, including those within the network clients and the network server, are substantially synchronized with each other. Once the decoders are presumed to be substantially synchronized, the frequencies of the STCs in each decoder within the network are substantially the same and the various decoders (e.g., decoders 314, 324, and 404) can decode data encoded by the MPEG encoder 308 in substantial synchrony with no noticeable delay between the various decoders.

In one embodiment, encoded data is transmitted from the television 102 to the various decoders 314, 324, and 404 before the predetermined amount of time has elapsed. In one embodiment, encoded data is transmitted from the television 102 to the various decoders 314, 324, and 404 for a predetermined amount of time before the decoders starts decoding.) Accordingly, encoded data may be accumulated within the local buffer of each decoder 314, 324, and 404. An exemplary decodes initiation process, adapted to ensure that decoders within the network 100 initiate decoding of encoded data substantially simultaneously, is described herein with respect to FIG. 8.

Figure 8:
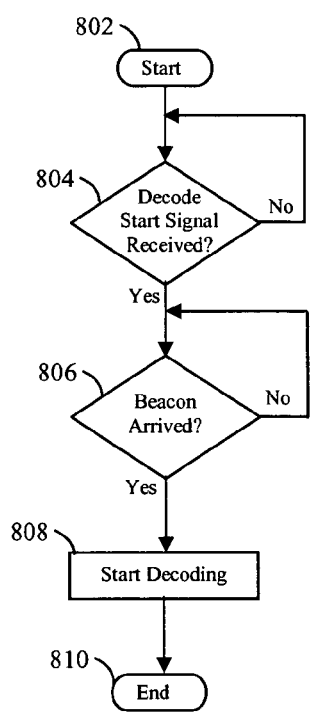
FIG. 8 illustrates one embodiment of an exemplary process of initiating the decoding of encoded data.

As shown in FIG. 8, the decode initiation process begins at 802 (e.g., after the processor 336 determines that the aforementioned predetermined amount of time has elapsed). At 804, the processor 414 determines whether a decode start signal has been received. In one embodiment, the decode start signal is adapted to cause the audio decoder 404 to decode the encoded data that has been transmitted from the PLC interface 402 when a predetermined condition is present. The predetermined condition may, for example, correspond to receipt of a beacon at the PLC interface 402 causing the PLC interface 402 to generate and transmit a beacon interrupt signal over the interrupt line 410. Accordingly, the audio decoder 404 may be caused to decode encoded data upon transmission of a beacon by the television 102. In one embodiment, the decode start signal may be generated by the processor 336 and transmitted to the PLC interface 330 via the internal bus 334. The PLC interface 330 subsequently transmits the decode start signal over the powerline 108 to the PLC interface 402 where it is then forwarded to the processor 414 via the internal bus 412. If a decode start signal is received at 804, then the processor 414 transmits the decode start signal to the audio decoder 404 via the internal bus 412 and the process continues to 806. If, at 806, the PLC interface 402 receives a beacon transmitted over the powerline 108, the PLC transmits a beacon interrupt signal over the interrupt line 410. At 808, the audio decoder 404, having already received the decode start signal from the processor 414, responds to the beacon interrupt signal transmitted by the PLC interface 402 by decoding encoded data. The process ends at 810.

Although the process has been specifically described above with respect to initiating decoding at the audio decoder 404, it will be appreciated that the aforementioned process described above with respect to FIG. 8 may be applied to initiate decoding at any decoder of any network client. Further, the aforementioned process described above with respect to FIG. 8 may be applied to initiate decoding at one or more decoders of the network server (e.g., the video decoder 314 and/or audio decoder 324). In this case, the processor 336 also transmits the aforementioned decode start signal directly to the video and audio decoders 314 and 324, respectively, via internal bus 334. Further, and as discussed above, the PLC interface 330 may generate and transmit a beacon interrupt signal to the video and audio decoders 314 and 324, respectively, via the interrupt line 332 whenever a beacon is transmitted therefrom.

Accordingly, when decode start signals are transmitted to all decoders within the network 100 as described above, the decoders within the network 100 can initiate decoding of encoded data substantially simultaneously (i.e., with no delay) based upon the broadcasting of a beacon over the powerline 108. Moreover, because each of the decoders within the network 100 is substantially synchronized, decoded data is presented to the user (e.g., via the display 118 and/or the speakers 120, 122, 124, 126, 128, and/or 130) substantially synchronously. The aforementioned clock adjustment process is performed while the decoders decode encoded data to ensure that the substantially synchronous operation of the STCs within the decoders of the network is maintained. The clock adjustment process does not adversely affect the ability of the decoders to decode encoded data.

As described above, the STC frequency of each decoder within the network 100 is presumed to be substantially the same after the aforementioned clock adjustment process has been performed. In one embodiment, the first SCR/PCR in the local buffer, which is the same value, is set to the STC of each of the decoders within the network 100. In another embodiment, the STC of each of the decoders within the network 100 may be set to a specific preset value. To set the STC of each of the decoders within the network, the processor 336 may generate a STC preset command signal and transmit the STC preset command signal to decoders of the network 100 (e.g., to the video and audio decoders 314 and 324, respectively, via the internal bus 334 and to the audio decoder 404 via the PLC interface 330 and the PLC interface 402). In one embodiment, the STC preset command signal is adapted to set the STC of a decoder to a specific preset value when a predetermined condition is present. The predetermined condition may, for example, correspond to transmission of a beacon from the PLC interface 330, causing the PLC interface 330 to generate and transmit a corresponding beacon interrupt signal over the interrupt line 332 to the video and audio decoders 314 and 324, respectively. Accordingly, the STC of the decoder may be set to the specific preset value upon transmission of a beacon by the television 102. As soon as the preset value is set, each STC starts counting up. In one embodiment, each STC is preset when the STC preset command is received and each STC starts counting up when a decode start signal is received and then a next beacon interrupt occurs.

Accordingly, the STC preset command signal may be transmitted from the processor 336 directly to the video and audio decoders 314 and 324, respectively, via the internal bus 334 and to the decoders of the network clients. For example, the processor may transmit the STC preset command signal to the PLC interface 330 via the internal bus 334. The PLC interface 330 may then transmit the STC preset command signal to the decoders within the network clients over the powerline 108. The PLC interface 402 may receive the STC preset command signal output from the television 102 and subsequently output to the received STC preset command signal to the processor 414 via the internal bus 412. The processor 414 may then transmit the STC preset command signal to the audio decoder 404 via the internal bus 412. When a beacon is received at the PLC interface 402, a beacon interrupt signal is transmitted to the audio decoder 404 via the interrupt line 410. Similarly, when the beacon is transmitted from the PLC interface 330, the PLC interface transmits a beacon interrupt signal to the video and audio decoders 314 and 324, respectively, via the interrupt line 332.

When STC preset command signals are transmitted to all decoders within the network 100 as described above, the STC values of STCs within the decoders of the network 100 can be set to a specific preset value substantially simultaneously with each other based upon the broadcasting of a beacon over the powerline 108. Moreover, because the STC frequencies of decoders within the network 100 are substantially the same, the STC value of each decoder within the network is incremented substantially synchronously.

When data stored in the HDD 312 is replayed, there are two ways to transmit. One is isochronous transmission wherein PCRs or SCRs are embedded in the stream. Each data packet is injected so that PCRs or SCRs are synchronized to the system clock in the network server (e.g., television 102). The original packet intervals will be reconstructed. All the decoders coupled to the powerline 108 are synchronized to the network clock so that the local buffer in each of the decoders never overflows or underflows. The other way is asynchronous transmission. Asynchronous transmission is used not only with a MPEG stream, but also with a fixed rate stream which includes no timestamps, for example, a linear PCM audio stream. Data stored in the HDD 312 is sent to each decoder (e.g., decoders 314, 324, and 404) so that the local buffer in each of the decoders does not overflow or underflow. The following mechanism keeps appropriate occupancy level of each local buffer.

Figure 9:
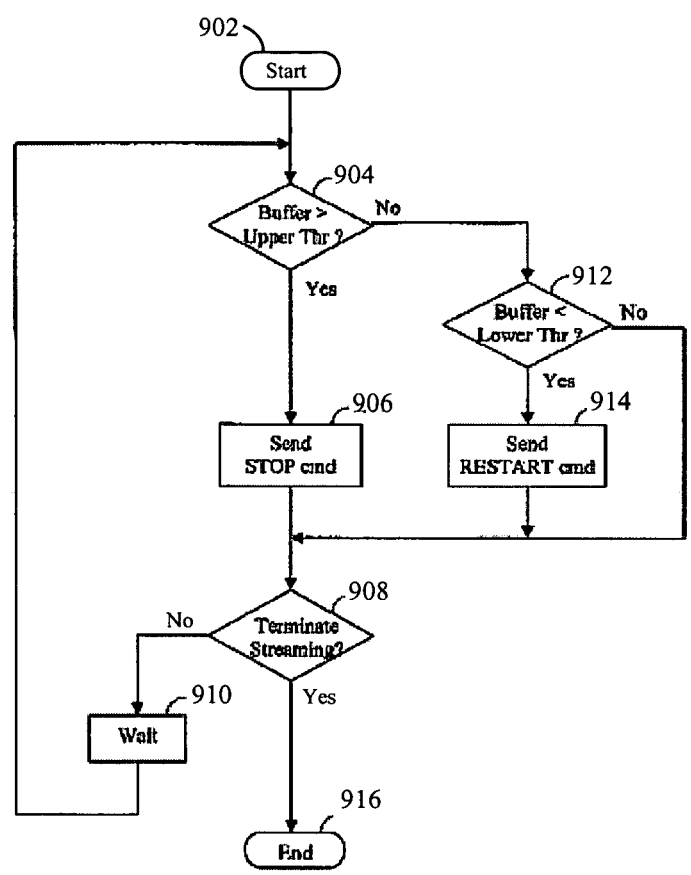
FIG. 9 describes one embodiment of a method of maintaining buffer occupancy levels within a network client in receipt of a replay data stream from a network server.

FIG. 9 describes one embodiment of an exemplary method by which buffer occupancy levels within a decoder of a network client, receiving replay data from a network server, may be maintained within a predetermined range. As shown in FIG. 9, the process begins at 902 where, for example, the audio decoder 404 has begun decoding replay data received from the PLC interface 402. As the audio decoder 404 decodes the replay data, the processor 414 monitors the buffer occupancy of the local buffer (i.e., the amount of replay data stored within the local buffer). At 904, the processor 414 monitors the buffer occupancy of the local buffer by comparing the current buffer occupancy with an upper threshold of the predetermined range (e.g., 80% of total buffer occupancy). If the current buffer occupancy exceeds the upper threshold, the process continues to 906 where the processor 414 generates and transmits a data stream control command signal (i.e., a stop command) to the PLC interface 402 via the internal bus 412. The PLC interface 402 then transmits the stop command to the television 102 over the powerline 108.

In one embodiment, the stop command that is transmitted from the audio amplifier unit 104 is adapted to prevent replay data from being transmitted from the television 102 to the audio amplifier unit 104 and any other network client (e.g., the stereo 106) then currently receiving replay data from the television 102. In other words, the stop command is adapted to alter a then current data streaming characteristic of the network server (e.g., the television 102). Accordingly, the PLC interface 330 receives and forwards the transmitted stop command to the processor 336. Upon receiving the stop command, the processor 336 outputs a control signal adapted to prevent replay data from being transmitted from the PLC interface 402 to the audio amplifier unit 104 and any other network clients. In one embodiment, the processor 336 may output such a control signal to the PLC interface 330 via internal bus 334 where it is subsequently broadcast to all decoders within the network 100. Accordingly, the television 102 ceases to transmit replay data to the audio amplifier unit 104 (and any other network clients) after the stop command is transmitted from the audio amplifier unit 104 at 906.

Next, at 908, the processor 414 determines whether replay stops or not. When the user sends a stop command from the remote control 116, the command is transmitted to the processor 414 over the powerline 108. In that case, the process goes to 916 and streaming terminates. If the processor 414 receives no stop command from the remote control 116, the processor 414 waits for a predetermined amount of time, for example 10 msec, at 910 and thereafter resumes monitoring the buffer occupancy of the local buffer at 904. If, the current buffer occupancy is determined at 904 not to be greater than the upper threshold, the process continues to 912 where the processor 414 monitors the buffer occupancy of the local buffer by comparing the current buffer occupancy with a lower threshold of the predetermined range (e.g., 20% of total buffer occupancy).

If, at 912, it is determined that the current buffer occupancy is less than the lower threshold, the process continues to 914 where the processor 414 generates and transmits a data stream control command signal (i.e., a restart command) to the PLC interface 402 via the internal bus 412. The PLC interface 402 then transmits the restart command to the television 102 over the powerline 108.

In one embodiment, the restart command that is transmitted from the audio amplifier unit 104 is adapted to enable replay data to be transmitted from the television 102 to the audio amplifier unit 104 and any other network client (e.g., the stereo 106) then currently not receiving replay data from the television 102. In other words, the restart command is adapted to alter a then current data streaming characteristic of the network server (e.g., the television 102). Accordingly, the PLC interface 330 receives and forwards the transmitted restart command to the processor 336. In a manner similar to the process described above, the processor 336 outputs a control signal adapted to cause replay data to be transmitted from the PLC interface 402 to the audio amplifier unit 104 (and any other network clients) upon receiving the restart command. Subsequently, the process proceeds to 908 and the processor 414 determines to terminate streaming or not. When the processor 414 terminates streaming, the process ends at 916. When the processor 414 does not terminate streaming, the process wait a certain time at 910 and goes back to 904 as described before.

As described above, the data stream control command signal is adapted to control the local buffer occupancy of each decoder. By transmitting the stop command, replay data is prevented from being transmitted from the television 102. Accordingly, as the audio decoder 404 receives new replay data within its local buffer, the buffer occupancy of its local buffer is eventually reduced to a level below the upper threshold. Moreover, by transmitting the restart command, the television 102 is enabled to resume streaming of replay data to the audio amplifier unit 104. Accordingly, as the television 102 transmits replay data to the audio decoder 404, the buffer occupancy of its local buffer is eventually elevated to a level above the lower threshold. By repeatedly transmitting appropriate data stream control command signals, the buffer occupancy can be maintained between the upper and lower thresholds, ensuring that the buffer occupancy does not overflow or underflow. The encoded data in the local buffer is independently decoded based on the STC, which is synchronized to the network clock.

Although the process has been specifically described above with respect to maintaining the buffer occupancy within the audio decoder 404 of the audio amplifier unit 104, it will be appreciated that the aforementioned process described above with respect to FIG. 9 may be applied to maintain the buffer occupancy within any decoder of any network client. Further, the aforementioned process described above with respect to FIG. 9 may be applied to maintain the buffer occupancy within one or more decoders of the network server (e.g., the video decoder 314 and/or audio decoder 324). In this case, the processor 336 simply prevents or enables data to be transmitted from the HDD 312 to the video decoder 314 and/or audio decoder 324 based upon their respective buffer occupancy levels. The processor 336 may receive a data stream control command from two or more decoders. Data can be stopped or retransmitted even if buffer occupancy of some decoders does not go beyond the range. This does not matter because all the decoders are synchronized. No decoder could overflow (underflow) when another decoder underflows (overflows).

Figure 10:
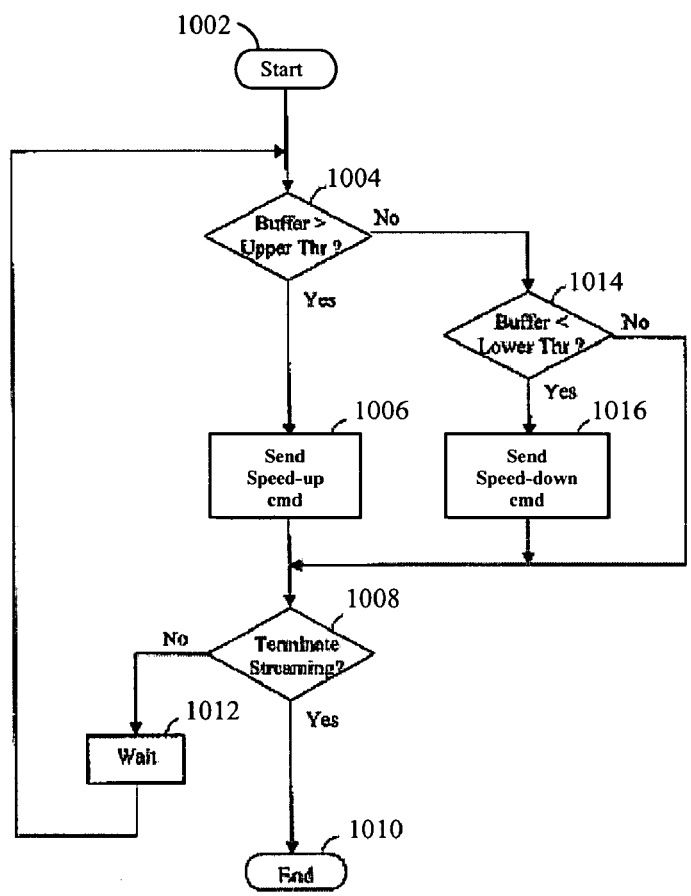
FIG. 10 describes one embodiment of a method of maintaining buffer occupancy levels within a network client in receipt of a real-time broadcast data stream from a network server.

When real-time analog or digital broadcast data is decoded, the system clock generated by the clock generator 350 is synchronized to the incoming stream. The network clock is synchronized to the system clock. Because all the decoders are locked to the network clock, no synchronization problem will occur. This mechanism is not appropriate when the server redistributes two or more independent streams. The network clock can be synchronized to only one stream. The other streams will be out of synchronization. FIG. 10 describes a method to synchronize the decoders when the network clock is not synchronized to the stream to transmit. In this method, buffer occupancy levels within a decoder of a network client, receiving broadcast data from a network server, may be maintained within a predetermined range. As shown in FIG. 10, the process begins at 1002 where, for example, the audio decoder 404 has begun decoding broadcast data received from the PLC interface 402. As the audio decoder 404 decodes the broadcast data, the processor 414 monitors the buffer occupancy of the local buffer (i.e., the amount of broadcast data stored within the local buffer).

At 1004, the processor 414 monitors the buffer occupancy of the local buffer by comparing the current buffer occupancy with an upper threshold of the predetermined range (e.g., 80% of total buffer occupancy). If the current buffer occupancy exceeds the upper threshold, the process continues to 1006 where the processor 414 generates and transmits a clock rate control command signal (i.e., a speed-up command) to the PLC interface 402 via the internal bus 412. The PLC interface 402 then transmits the speed-up command to the television 102 over the powerline 108.

In one embodiment, the speed-up command that is transmitted from the audio amplifier unit 104 at 1006 is adapted to cause the processor 336 to generate a clock adjustment ratio, R, that can thereafter be used to increase the frequency of the STC within the audio decoder 404 and a decoder of any other network client (e.g., the stereo 106) then currently receiving broadcast data from the television 102. Accordingly, the PLC interface 330 receives and forwards the transmitted speed-up command to the processor 336.

Upon receiving the speed-up command generated at 1006, the processor 336 generates a clock ratio adjustment signal containing a clock adjustment ratio, R, adapted to increase the frequency of the STC within the audio decoder 404 of the audio amplifier unit 104 and any other network clients. In this case, the clock adjustment ratio, R, is greater than 1 (e.g., 1.0001, indicating an STC frequency increase of +100 ppm). The clock ratio adjustment signal is then transmitted from the processor 336 to the PLC interface 330 via the internal bus 334. Subsequently, the PLC interface 330 broadcasts the clock ratio adjustment signal over the powerline 108 where it is received by the PLC interface 402 and transmitted to the processor 414.

The processor 414 then obtains the clock adjustment ratio, R, from the clock ratio adjustment signal as the clock adjustment process is being performed with respect to the audio amplifier unit 104. A clock adjustment process is then performed with respect to the STC of the audio decoder 404 using the obtained clock adjustment ratio, R as shown in FIG. 5. For example, the processor 414 uses the obtained clock adjustment ratio, R, to compute the differential timestamp value at 506 according to the following formula: diff_ts=R*(timestamp(n+1)−(timestamp(n))*fstc/fts. When the comparing at 510 would otherwise indicate that the predetermined relationship exists between the differential local clock and the differential timestamp value, the comparing at 510 will indicate that the differential local clock value is less than the differential timestamp value. Accordingly, the clock rate adjustment command signal transmitted at 512 will increase the frequency of the STC of the audio decoder 404 so as to bring the differential local clock value closer to, or within, the predetermined relationship of the differential timestamp value.

Next, at 1008, the processor 414 determines whether streaming stops or not. When the user sends a stop command from the remote control 116, the command is transmitted to the processor 414 over the powerline 108. In that case, the process goes to 1010 and streaming terminates. If the processor 414 does not receives a stop command from the remote control 116, the processor 414 waits for a predetermined amount of time, for example 10 msec, at 1012 and thereafter resumes monitoring the buffer occupancy of the local buffer at 1004. If the current buffer occupancy is determined at 1004 not to be greater than the upper threshold, the process continues to 1014 where the processor 414 monitors the buffer occupancy of the local buffer by comparing the current buffer occupancy with a lower threshold of the predetermined range (e.g., 20% of total buffer occupancy). If the current buffer occupancy is less than the lower threshold, the process continues to 1016 where the processor 414 generates and transmits a data stream control command signal (i.e., a speed-down command) to the PLC interface 402 via the internal bus 412. The PLC interface 402 then transmits the speed-down command to the television 102 over the powerline 108.

In one embodiment, the speed-down command that is transmitted from the audio amplifier unit 104 at 1016 is adapted to cause the processor 336 to generate a clock adjustment ratio, R, that can thereafter be used to decrease the frequency of the STC within the audio decoder 404 and a decoder of any other network client (e.g., the stereo 106) then currently receiving broadcast data from the television 102. Accordingly, the PLC interface 330 receives and forwards the transmitted speed-down command to the processor 336.

Upon receiving the speed-down command generated at 1016, the processor 336 generates a clock ratio adjustment signal containing a clock adjustment ratio, R, adapted to decrease the frequency of the STC within the audio decoder 404 of the audio amplifier unit 104 and any other network clients. In this case, the clock adjustment ratio, R, is less than 1 (e.g., 0.9999, indicating an STC frequency decrease of −100 ppm). The clock ratio adjustment signal is then transmitted from the processor 336 to the PLC interface 330 via the internal bus 334. Subsequently, the PLC interface 330 broadcasts the clock ratio adjustment signal over the powerline 108 where it is received by the PLC interface 402 and transmitted to the processor 414.

The processor 414 then obtains the clock adjustment ratio, R, from the clock ratio adjustment signal as the clock adjustment process is being performed with respect to the audio amplifier unit 104. A clock adjustment process is then performed with respect to the STC of the audio decoder 404 using the obtained clock adjustment ratio, R as shown in FIG. 5. For example, the processor 414 uses the obtained clock adjustment ratio, R, to compute the differential timestamp value at 506 according to the following formula: diff_ts=R*(timestamp(n+1)−(timestamp(n))*fstc/fts. When the comparing at 510 would otherwise indicate that the predetermined relationship exists between the differential local clock and the differential timestamp value, the comparing at 510 will indicate that the differential local clock value is greater than the differential timestamp value. Accordingly, the clock rate adjustment command signal transmitted at 512 will decrease the frequency of the STC of the audio decoder 404 so as to bring the differential local clock value closer to, or within, the predetermined relationship of the differential timestamp value. If, at 1014, it is determined that the current buffer occupancy is less than the lower threshold (or after the speed-down command has been transmitted in accordance with 1016), the process continues to 1008.

As described above, the clock rate control command signal is adapted to control the local buffer occupancy of each decoder. By transmitting a speed-up command adapted to increase the frequency of the STC of the audio decoder 404, the rate with which the audio decoder 404 retrieves and decodes the broadcast data stored within its local buffer can be increased. As a result, the buffer occupancy of the local buffer may be eventually reduced to a level below the upper threshold. Moreover, by transmitting a speed-down command adapted to decrease the frequency of the STC of the audio decoder 404, the rate with which the audio decoder 404 retrieves and decodes the broadcast data stored within its local buffer can be decreased. As a result, the buffer occupancy of the local buffer may be eventually elevated to a level above the lower threshold. By repeatedly transmitting appropriate clock rate control command signals, the frequency of the STC within a decoder can be increased or decreased to maintain the buffer occupancy between the upper and lower thresholds, ensuring that the buffer occupancy does not overflow or underflow.

Although the process has been specifically described above with respect to maintaining the buffer occupancy within the audio decoder 404 of the audio amplifier unit 104, it will be appreciated that the aforementioned process described above with respect to FIG. 10 may be applied to maintain the buffer occupancy within any decoder of any network client. Further, the aforementioned process described above with respect to FIG. 10 may be applied to maintain the buffer occupancy within one or more decoders of the network server (e.g., the video decoder 314 and/or audio decoder 324). In this case, the processor 336 simply incorporates the clock adjustment ratio, R, in computing the differential timestamp value when the clock adjustment process is performed with respect to the video and audio decoders 314 and 324, respectively. The processor 336 may receive a clock rate control command signal from two or more decoders. The clock rate could be adjusted even if buffer occupancy of some decoders does not go beyond the range. This does not matter because all the decoders are synchronized. No decoder could overflow (underflow) when another decoder underflows (overflows).

In one embodiment, the network server (i.e., television 102) may adjust its own system clock (i.e., the network clock) based on the clock adjustment ratio R. In this case, no speedup/-down command is sent to the clients. The client clock synchronizes to the network clock adjusted by the clock adjustment ratio R.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of synchronizing a plurality of decoders within a network to a server by way of a processor coupled to a network interface and to the plurality of decoders, comprising:

providing the processor coupled to the network interface and to the plurality of decoders;

receiving a set of timestamp signals, each timestamp signal within the set of timestamp signals having a value corresponding to a timestamped beacon transmitted by a network server, the network server for streaming encoded data over a network through the network interface;

receiving a set of local clock signals, each local clock signal within the set of local clock signals having a value generated by a local system time clock associated with a plurality of decoders of a network client, the plurality of decoders for decoding the encoded data;

computing a differential timestamp value based on values of timestamp signals within the set of timestamp signals by the processor;

computing a differential local clock value based on values of local clock signals within the set of local clock signals;

determining whether the differential local clock value has a predetermined relationship with respect to the differential timestamp value, wherein the predetermined relationship exists when the differential local clock value and the differential timestamp value are equal or within a predefined tolerance;

transmitting a clock rate adjustment command signal to the plurality of decoders when it is determined that the differential local clock value does not have the predetermined relationship with the differential timestamp value, the clock rate adjustment command signal for adjusting the local system time clock such that a subsequent differential local clock value will have the predetermined relationship with the differential timestamp value;

when the predetermined relationship exists, preventing sending unneeded clock rate adjustment command signals to the plurality of decoders; and adjusting a buffer occupancy of the plurality of decoders, wherein adjusting the buffer occupancy comprises:

comparing a current buffer occupancy at each of the plurality of decoders to a predefined threshold to determine whether a relationship exists between the current buffer occupancy and the predefined threshold; and adjusting the buffer occupancy when it is determined that the relationship exists; thereby contemporaneously performing a clock rate adjustment while the plurality of decoders is decoding encoded data, and wherein a decoding delay between any two decoders of the plurality of decoders is maintained in a range of less than 10 milliseconds.

2. The method of claim 1, further comprising:

receiving a beacon interrupt signal from a network interface associated with the network client, the beacon interrupt signal generated by the network interface upon receipt of a beacon transmitted by the network server, wherein each timestamp signal of the set of timestamp signals is received from the network interface and has a value corresponding to a beacon interrupt signal.

3. The method of claim 1, further comprising:

receiving a beacon interrupt signal from a network interface associated with the network client, the beacon interrupt signal generated by the network interface upon receipt of a beacon transmitted by the network server, wherein each local clock signal of the set of local clock signals is received from the local system time clock and has a value corresponding to a beacon interrupt signal.

4. The method of claim 1, further comprising:

receiving the sets of timestamp and local clock signals within a period during which a predetermined number of beacons are output by the network server; and transmitting the clock rate adjustment command signal to the decoder before a beacon is output subsequent to the period.

5. The method of claim 1, wherein the clock rate adjustment command signal increases the frequency of the local system time clock when the differential local clock value is less than the differential timestamp value.

6. The method of claim 1, wherein the clock rate adjustment command signal decreases the frequency of the local system time clock when the differential local clock value is greater than the differential timestamp value.

7. The method of claim 1, further comprising: receiving a system time clock preset command signal; and transmitting the system time clock preset command signal to the local system time clock, the system time clock preset command signal setting the local system time clock to a specific preset value upon transmission of a beacon by the network server.

8. The method of claim 1, further comprising:
receiving a decode start signal after transmitting the clock rate adjustment command signal; and
transmitting the decode start signal to the decoder, wherein decode start signal causes the decoder to decode the encoded data upon transmission of a beacon by the network server.

9. The method of claim 1, wherein:
determining whether a relationship exists between the current buffer occupancy and a predefined threshold comprises determining whether a buffer occupancy of a local buffer of each decoder of the plurality of decoders is within a predetermined range of a total buffer occupancy as each decoder of the plurality of decoders decodes encoded data within the local buffer; and
adjusting the buffer occupancy when it is determined that the relationship exists comprises transmitting a data stream control command signal to the network server when it is determined that
the buffer occupancy is outside the predetermined range, the data stream control command signal altering a then-current data streaming characteristic of the network server.

10. The method of claim 9, wherein the data stream control command signal causes the network server to stop streaming data when it is determined that the buffer occupancy exceeds an upper threshold of the predetermined range.

11. The method of claim 9, wherein the data stream control command signal causes the network server to resume streaming data when it is determined that the buffer occupancy exceeds a lower threshold of the predetermined range.

12. The method of claim 1, wherein:
determining whether a relationship exists between the current buffer occupancy and a predefined threshold comprises:
determining whether a buffer occupancy of a local buffer of each decoder of the plurality of decoders is within a predetermined range of a total buffer occupancy as each decoder of the plurality of decoders decodes encoded data within the local buffer; and
wherein adjusting the buffer occupancy when it is determined that the relationship exists comprises:
transmitting a clock rate control command signal to the network server when it is determined that the buffer occupancy is outside the predetermined range;
receiving a clock ratio adjustment signal corresponding to the clock rate control command signal, the clock ratio adjustment signal containing a clock adjustment ratio;
computing the clock rate adjustment command signal based on the clock adjustment ratio; and
transmitting the computed clock rate adjustment command signal to each decoder of the plurality of decoders to adjust the local system time clock such that a subsequent differential local clock value is within the predetermined range of the total buffer occupancy.

13. The method of claim 12, wherein the clock rate adjustment command signal increases the frequency of the local system time clock when it is determined that the buffer occupancy exceeds an upper threshold of the predetermined range.

14. The method of claim 12, wherein the clock rate adjustment command signal decreases the frequency of the local system time clock when it is determined that the buffer occupancy exceeds a lower threshold of the predetermined range.

15. A network device, comprising:
a network interface for receiving encoded data transmitted over a network;
a plurality of decoders, coupled to the network interface, for decoding the received encoded data; and
a processor coupled to the network interface and the plurality of decoders, the processor containing circuitry for:
receiving a set of timestamp signals via the network interface, wherein each timestamp signal within the set of timestamp signals has a value corresponding to a timestamped beacon transmitted by a network server;
receiving a set of local clock signals, wherein each local clock signal within the set of local clock signals has a value generated by a local system time clock associated with the plurality of decoders;
computing a differential timestamp value based on values of timestamp signals within the set of timestamp signals;
computing a differential local clock value based on values of local clock signals within the set of local clock signals;
determining whether the differential local clock value has a predetermined relationship with respect to the differential timestamp value, wherein the predetermined relationship exists when the differential local clock value and the differential timestamp value are equal or within a predefined tolerance;
transmitting a clock rate adjustment command signal to the plurality of decoders when it is determined that the differential local clock value does not have the predetermined relationship with the differential timestamp value, wherein the clock rate adjustment command signal adjusts the local
system time clock such that a subsequent differential local clock value will have the predetermined relationship with the differential timestamp value;
when the predetermined relationship exists, preventing sending unneeded clock rate adjustment command signals to the plurality of decoders; and
adjusting a buffer occupancy of the plurality of decoders, wherein adjusting the buffer occupancy comprises:
determining whether a relationship exists between the current buffer occupancy and a predefined threshold; and
adjusting the buffer occupancy when it is determined that the relationship exists; whereby a clock rate adjustment is contemporaneously performable while the plurality of decoders is decoding encoded data, and
wherein a decoding delay between any two decoders of the plurality of decoders is maintained in a range of less than 10 milliseconds.

16. The network device of claim 15, wherein the clock rate adjustment command signal increases the frequency of the local system time clock when the differential local clock value is less than the differential timestamp value and decreases the frequency of the local system time clock when the differential local clock value is greater than the differential timestamp value.

17. The network device of claim 15, wherein
each decoder of the plurality of decoders includes a local buffer for storing encoded data;
each decoder of the plurality of decoders decodes the encoded data stored within the local buffer; and
wherein determining whether a relationship exists between the current buffer occupancy and a predefined threshold comprises:
determining whether a buffer occupancy of the local buffer is within a predetermined range of a total buffer occupancy; and wherein adjusting the buffer occupancy when it is determined that the relationship exists comprises:
transmitting a data stream control command signal to the network server when it is determined that the buffer occupancy is outside the predetermined range, and
wherein the data stream control command signal alters a then-current data streaming characteristic of the network server.

18. The network device of claim 15, wherein
each decoder of the plurality of decoders includes a local buffer for storing encoded data;
each decoder of the plurality of decoders decodes the encoded data stored within the local buffer; and
wherein determining whether a relationship exists between the current buffer occupancy and a predefined threshold comprises:
determining whether a buffer occupancy of the local buffer is within a predetermined range of a total buffer occupancy; and
wherein adjusting the buffer occupancy when it is determined that the relationship exists comprises:
transmitting a clock rate control command signal to the network server when it is determined that the buffer occupancy is outside the predetermined range;
receiving a clock ratio adjustment signal corresponding to the clock rate control command signal, the clock ratio adjustment signal containing a clock adjustment ratio;
computing the clock rate adjustment command signal based on the clock adjustment ratio; and
transmitting the computed clock rate adjustment command signal to each decoder of the plurality of decoders to adjust the local system time clock such that a subsequent differential local clock value is within the predetermined range of the total buffer occupancy.

19. The method of claim 1, wherein the beacon transmission is approximately 40 milliseconds before a second beacon transmission.

20. A method of fabricating a network device, comprising providing a processor coupled to a network interface and to the plurality of decoders, the processor
providing step comprising:
providing a network interface for receiving encoded data transmitted over a network;
coupling a plurality of decoders to the network interface for decoding the received encoded data; and
coupling a processor to the network interface and the plurality of decoders, the processor coupling step comprising providing the processor containing circuitry for:
receiving a set of timestamp signals via the network interface, wherein each timestamp signal within the set of timestamp signals has a value corresponding to a timestamped beacon transmitted by a network server;
receiving a set of local clock signals, wherein each local clock signal within the set of local clock signals has a value generated by a local system time clock associated with the decoder;
computing a differential timestamp value based on values of timestamp signals within the set of timestamp signals;
computing a differential local clock value based on values of local clock signals within the set of local clock signals;
determining whether the differential local clock value has a predetermined relationship with respect to the differential timestamp value, wherein the predetermined relationship exists when the differential local clock value and the differential timestamp value are equal or within a predefined tolerance;
transmitting a clock rate adjustment command signal to the plurality of decoders when it is determined that the differential local clock value does not have the predetermined relationship with the differential timestamp value, wherein the clock rate adjustment command signal adjusts the local system time clock such that a subsequent differential local clock value will have the predetermined relationship with the differential timestamp value;
when the predetermined relationship exists, preventing sending unneeded clock rate adjustment command signals to the plurality of decoders; and
adjusting a buffer occupancy of the plurality of decoders, wherein adjusting the buffer occupancy comprises:
comparing a current buffer occupancy at each of the plurality of decoders to a predefined threshold to determine whether a relationship exists between the current buffer occupancy and the predefined threshold; and
adjusting the buffer occupancy when it is determined that the relationship exists; whereby a clock rate adjustment is contemporaneously performable while the plurality of decoders is decoding encoded data, and
wherein a decoding delay between any two decoders of the plurality of decoders is maintained in a range of less than 10 milliseconds.

21. The method of claim 1, wherein the range of decoding delay comprises less than approximately 1 millisecond.

22. The network device of claim 15, wherein the range of decoding delay comprises less than approximately 1 millisecond.

23. The method of claim 20, wherein the range of decoding delay comprises less than approximately 1 millisecond.

24. A method of synchronizing a plurality of decoders within a network to a server by way of a processor coupled to a network interface and to the plurality of decoders, comprising:
providing the processor coupled to the network interface and to the plurality of decoders;
receiving a set of timestamp signals, each timestamp signal within the set of timestamp signals having a value corresponding to a timestamped beacon transmitted by a network server, the network server for streaming encoded data over a network through the network interface;
receiving a set of local clock signals, each local clock signal within the set of local clock signals having a value generated by a local system time clock associated with a plurality of decoders of a network client, the plurality of decoders for decoding the encoded data;
computing a differential timestamp value based on values of timestamp signals within the set of timestamp signals by the processor;
computing a differential local clock value based on values of local clock signals within the set of local clock signals;
determining whether the differential local clock value has a predetermined relationship with respect to the differential timestamp value, wherein the predetermined relationship exists when the differential local clock value and the differential timestamp value are equal or within a predefined tolerance;
transmitting a clock rate adjustment command signal to the plurality of decoders when it is determined that the differential local clock value does not have the predetermined relationship with the differential timestamp value, the clock rate adjustment command signal for adjusting the local system time clock such that a subsequent differential local clock value will have the predetermined relationship with the differential timestamp value;

when the predetermined relationship exists, preventing sending unneeded clock rate adjustment command signals to the plurality of decoders; and adjusting a buffer occupancy of the plurality of decoders, thereby contemporaneously performing a clock rate adjustment while the plurality of decoders is decoding encoded data, and wherein a decoding delay between any two decoders of the plurality of decoders is maintained in a range of less than 10 milliseconds;

wherein adjusting the buffer occupancy of the plurality of decoders comprises:

determining whether a buffer occupancy of a local buffer of each decoder of the plurality of decoders is within a predetermined range of a total buffer occupancy as each decoder of the plurality of decoders decodes encoded data within the local buffer;

transmitting a clock rate control command signal to the network server when it is determined that the buffer occupancy is outside the predetermined range;

receiving a clock ratio adjustment signal corresponding to the clock rate control command signal, the clock ratio adjustment signal containing a clock adjustment ratio;

computing the clock rate adjustment command signal based on the clock adjustment ratio by the processor to compute the differential timestamp value, wherein the differential timestamp value is defined by a parameter selected from a group consisting essentially of:

a difference in values between a pair of timestamps having been consecutively transmitted by the powerline communication interface;

an average difference in values between a plurality of pairs of consecutively output timestamps; and transmitting the computed clock rate adjustment command signal to each decoder of the plurality of decoders to adjust the local system time clock such that a subsequent differential local clock value is within the predetermined range of the total buffer occupancy.

* * * * *